United States Patent Office 3,357,519
Patented Dec. 12, 1967

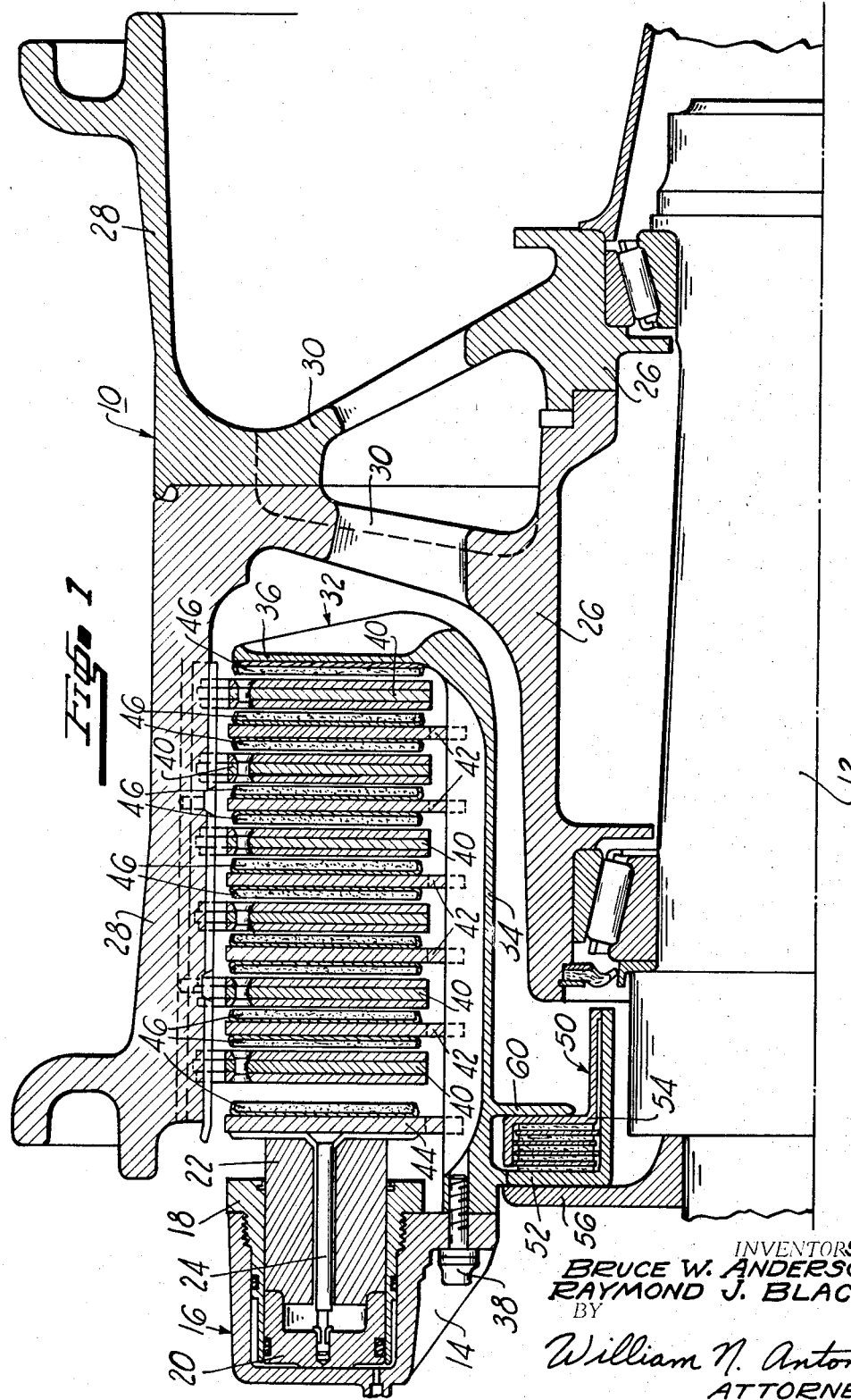

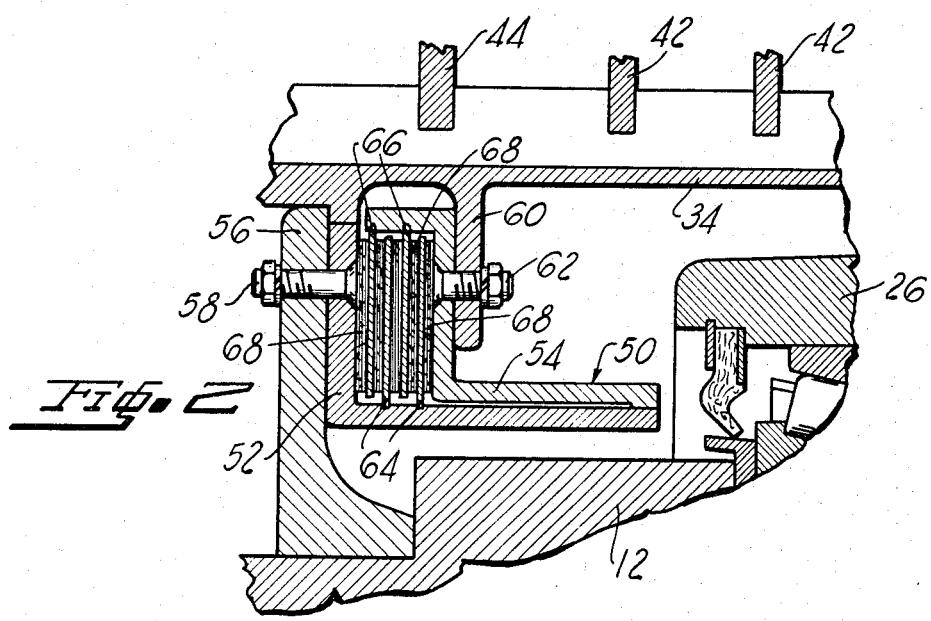
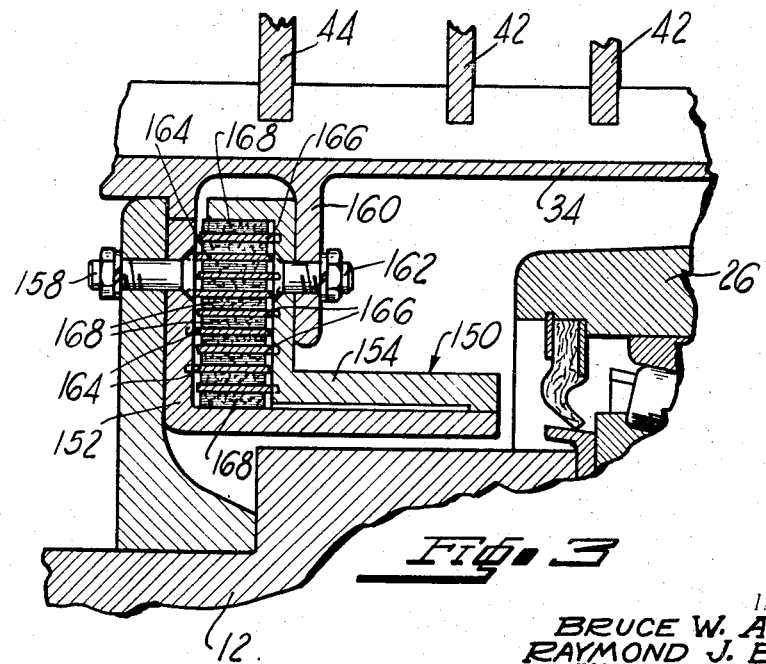

3,357,519
AIRCRAFT BRAKE DAMPER MECHANISM
Bruce W. Anderson and Raymond J. Black, South Bend, Ind., assignors to The Bendix Corporation, a corporation of Delaware
Filed Mar. 21, 1966, Ser. No. 536,024
9 Claims. (Cl. 188—18)

ABSTRACT OF THE DISCLOSURE

The following relates to a brake damper mechanism for use in conjunction with an aircraft wheel and brake assembly. The damper mechanism is interposed between fixed mounting means, such as the wheel axle and an axle flange, and non-rotatable brake means, such as the brake stators, the torque tube to which the stators are attached, and a torque tube flange, for providing an elastic torque path between the fixed mounting means and the non-rotatable brake means which will substantially eliminate torsional vibrations induced in the non-rotatable brake means during braking. The damper mechanism includes an elastomeric damping material which is stressed in shear upon relative movement between the fixed mounting means and the non-rotatable brake means.

---

During braking of an aircraft, "negative damping" is produced by the sliding contact between the brake linings and adjacent brake bearing elements, or in other words, between the brake stators and rotors. The production of such negative damping can excite vibration modes within the brakes per se, as well as the structural modes of aircraft landing gear-brake systems. Such vibrations not only create an excessive amount of noise, but also reduce the life of the brake lining and cause structural fatigue of the landing gear components.

Accordingly, it is an object of this invention to provide a brake damper mechanism which is designed to counteract negative damping.

In other words, it is an object of this invention to mount a brake damper mechanism between the brake per se and the structure mounting flanges which provides sufficient positive damping to appreciably reduce or completely eliminate the vibrations which arise upon the occurrence of negative damping.

Another object of this invention is to damp the vibrations of the primary torsional mode which consists of torsional windup of the brake nonrotating parts on the strut mounting structure. Such damping will result in a reduction in coupling with other strut structional modes.

An important object of this invention is to provide an elastic torque path between the stationary parts of the brake and the strut mounting of the brake by inserting a brake damper capsule therebetween.

More specifically, it is an object of this invention to provide a gap interface between two separated points in the aforementioned torque path and a high damping material attached to the two sides of the gap interface so that, in passage of a torque through the elastic torque path, a high relative deflection between the two separated points in the torque path occurs and results in high shear strains in the damping material.

Another object of this invention is to provide relatively high elastic deflections of the brake damper housing in a limited space.

A further object of this invention is to provide multiple shear layers in a brake damper mechanism of the type described in order to increase the damper effectiveness.

A still further object of this invention is to provide multiple shear layers of different materials to achieve high damping over a large range of temperature and/or frequency conditions.

A significant object of this invention is to provide a brake damper mechanism for use in connection with an aircraft wheel and brake assembly which will permit the use of longer wearing linings, thereby resulting in a more economical braking system.

The above and other objects and features of this invention will be apparent from the following description taken in connection with the accompanying drawings which form a part of this disclosure and in which:

FIGURE 1 is a sectional view of one-half of a symmetrical wheel and brake assembly which incorporates the invention;

FIGURE 2 is an enlarged sectional view of a portion of the wheel and brake assembly which incorporates the invention; and FIGURE 3 is an enlarged sectional view, similar to FIGURE 2, which shows another embodiment of the invention.

Referring to FIGURE 1, it will be seen that the wheel and brake assembly which is illustrated includes a wheel 10 rotatably mounted on a stationary axle 12 and a stationary carrier member 14 which is connected to the axle through any suitable means, such as by a direct bolt connection (not shown). The construction for rotatably mounting the wheel 10 to axle 12 and fixing the stationary carrier 14 to the axle 12 is well known, and a description thereof is not deemed to be necessary. The carrier contains a plurality of fluid motors 16, each of which includes a protective sleeve 18 threadedly secured thereto and a piston 20 located and slidable in said sleeve. A block of insulating material 22 is secured to the head end of the piston by a threaded pin 24 for protecting the hydraulic brake fluid from the heat generated during braking. The wheel 10 which is formed of two sections fastened together by a plurality of bolts (not shown), includes a hub portion 26 and a rim portion 28 interconnected by a plurality of spokes 30 which define a plurality of windows therebetween through which air may pass for cooling. A torque tube 32, which includes a sleeve 34 and an annular backing plate flange 36, is fixedly secured to the carrier member 14 by a plurality of circumferentially spaced bolts 38.

The brake which is illustrated is of the disc type and includes a plurality of interleaved rotors 40, which are splined to and are rotated by the aircraft wheel 10, and stators 42, which are splined to sleeve 34 of the torque tube 32. Both the rotors and stators are movable axially and are sometimes referred to as a brake "stack." It is the frictional engagement of these relatively rotatable rotors and stators which produces the desired braking action on the aircraft wheel. A pressure plate 44, which is suitably attached to the fluid motors 16, forces the rotors 40 and stators 42 against each other upon actuation of the motors by thrusting at one side of the stack and biasing the entire stack against the backing plate 36. Pressure plate 44, each of the stators 42, and the backing plate have friction material lining 46 provided thereon. The lining is formed by a plurality of friction pads located in cups which are suitably secured to the associated mounting structure. Neither the composition, arrangement, nor mounting of the friction segments forms an essential part of the present invention.

The brake damper mechanism shown in FIGURES 1 and 2, which is indicated generally by the numeral 50, comprises a housing formed of two annular parts 52 and 54, one of which is suitably attached to an axle flange 56 through means such as a plurality of bolts 58 and the other of which is suitably attached to a torque tube flange 60 through means such as a plurality of bolts 62. A plurality of annular plates 64 are keyed or otherwise suitably attached to one of the housing parts and are interleaved with a plurality of annular plates 66 which are keyed or otherwise suitably attached to the other of the housing parts. Located between the plates 64 and 66, which are spaced from each other and the housing, are elastomeric layers of suitable high damping material 68, such as, for example, polyisobutylene, polysulfide rubber or polyvinyl chloride materials, with a high "loss modulus," which layers are bonded or otherwise suitably attached to the adjacent faces of the plates or housing. It will be understood that such elastomeric layers are deemed to include polymeric or other types of attachable layers having the desired damping characteristics.

Operation of the damper mechanism will be as follows: During braking, torsional windup of the non-rotating parts of the brake and supporting structure will occur and will be accompanied by detrimental torsional vibrations. During such braking the primary torsional mode of the non-rotating or stationary parts, which comprises an inertial system made up of the stators 42, the torque tube 32 (including sleeve 34 and backing plate 36), carrier member 14, pressure plate 44, and an elastic system made up of the inherent elasticity of the aforementioned parts plus primarily the torsional elasticity of the damper capsule 50 and the elasticity of the torque train from the brake mounting or axle flange 56 to the vertical centerline of the aircraft landing gear strut, is acted upon by brake torque from the rotor stator interface. This torque, in addition to being an approximately constant torque level, also has the feature that, at certain combinations of mean stator-rotor rotational velocity, interface temperatures, previous history of braking, and applied brake pressure (from fluid motors 16); it will show an instantaneous velocity sensitivity whereby a decrease in rotational speed will bring about a slight increase in torque level. This feature, which has previously been referred to as negative damping, can, in the absence of sufficient positive damping within the structural elements of the elastic torque train, cause any small vibratory or noise type disturbance (which disturbances are always present) to grow to a large oscillation of the squeal mode.

Because of the attachment of the brake damper capsule 50 to the axle flange 56 and torque tube flange 60 the described elastic torque path is provided therebetween. Thus, upon oscillatory twisting of the primary torsional mode, passage of a torque through the elastic torque path provided in part by the damper capsule results in a relatively high deflection between the relatively movable plates and parts of the housing and consequent high shear strains in the damping material 68 therebetween. Such relative movement within the damper capsule provides sufficient positive damping to counteract the negative damping produced during braking and appreciably reduces or completely eliminates the undesirable and detrimental torsional vibrations produced by such negative damping. Although the relative movement referred to above between the damper components attached to the torque tube flange and the damper components attached to the axle flange will amount to only fifty or sixty thousandths of an inch, such movement amounts to a relatively high deflection insofar as the torsional windup is concerned and is sufficient to accomplish the purpose for which it is intended. If desired, the damping material 68 may be prestressed so that at normal operating brake torques the damping material will have a net mean stress of some predetermined value, such as for example approximately zero, thereby maximizing material design variables such as service life and/or damping.

In the brake damper mechanism shown in FIGURE 3, like parts are designated by like numerals plus 100. Furthermore, it will be noted that this mechanism is attached to the wheel and brake assembly in essentially the same manner as the previous embodiment and differs only in that cylindrical members 164 and 166 with damping material 168 therebetween are utilized in place of the annular components shown in FIGURE 2. Such a cylindrical arrangement provides an equally effective elastic torque path and functions in essentially the same manner as the previously described annular arrangement.

The several advantages which flow from this invention are believed to be obvious from the above description, and other advantages may suggest themselves to those who are familiar with the art to which this invention relates.

Furthermore, although this invention has been described in connection with certain specific embodiments, it will be obvious to those skilled in the art that various changes may be made in the form, structure, and arrangement of parts without departing from the spirit of the invention. Accordingly, we do not desire to be limited to the specific embodiments disclosed herein primarily for purposes of illustration, but instead desire protection falling within the scope of the appended claims.

Having thus described the various features of the invention, what we claim as new and desire to secure by Letters Patent is:

1. In an aircraft wheel and brake assembly having fixed mounting means, rotatable brake means, and non-rotatable brake means operatively connected to said fixed mounting means and frictionally engaging said rotatable brake means, said non-rotatable brake means having torsional vibrations induced therein upon frictional engagement with said rotatable brake means, damping means located between and operatively connected to said fixed mounting means and said non-rotatable brake means for providing an elastic torque path therebetween which will substantially eliminate said torsional vibrations, said damping means including housing means having first and second parts, one part of which is fixedly connected to said fixed mounting means and the other part of which is fixedly connected to said non-rotatable brake means, and an elastomeric damping material located between and attached to said first and second parts of said housing means for being stressed in shear upon relative movement between said first and second parts.

2. The combination defined in claim 1, wherein said first and second parts of said housing means include a plurality of members interleaved and spaced from each other, and said elastomeric damping material is comprised of a plurality of layers one of which is located between and attached to each adjacent pair of interleaved members.

3. The combination defined in claim 2, wherein said interleaved members are annular and parallel.

4. The combination defined in claim 2, wherein said interleaved members are cylindrical and concentric.

5. The combination defined in claim 2, wherein said layers of damping material are bonded to the adjacent faces of said interleaved members.

6. The combination defined in claim 2, wherein said layers of damping material have high damping characteristics.

7. The combination defined in claim 5, wherein said layers of damping material are prestressed so that at normal operating brake torques the damping material will have a net mean stress of a predetermined value.

8. The combination defined in claim 1, wherein said fixed mounting means comprises a wheel axle and an axle flange, said rotatable brake means comprises the wheel and the brake rotors attached thereto, and said non-rotatable brake means comprises the brake stators, the torque tube to which the stators are attached, and a torque tube flange.

9. The combination defined in claim 8, wherein said first part of said housing means is fixedly connected to said axle flange and said second part of said housing means is connected to said torque tube flange.

References Cited

UNITED STATES PATENTS 2,868,037  1/1959  Hindmarck _____ 188—217 X
2,885,031  5/1959  Hindmarck _____ 188—72

DUANE A. REGER, *Primary Examiner.*